May 31, 1966 — P. MAKER — 3,253,660
VARIABLE PITCH PROPELLER
Filed April 16, 1964 — 3 Sheets-Sheet 1
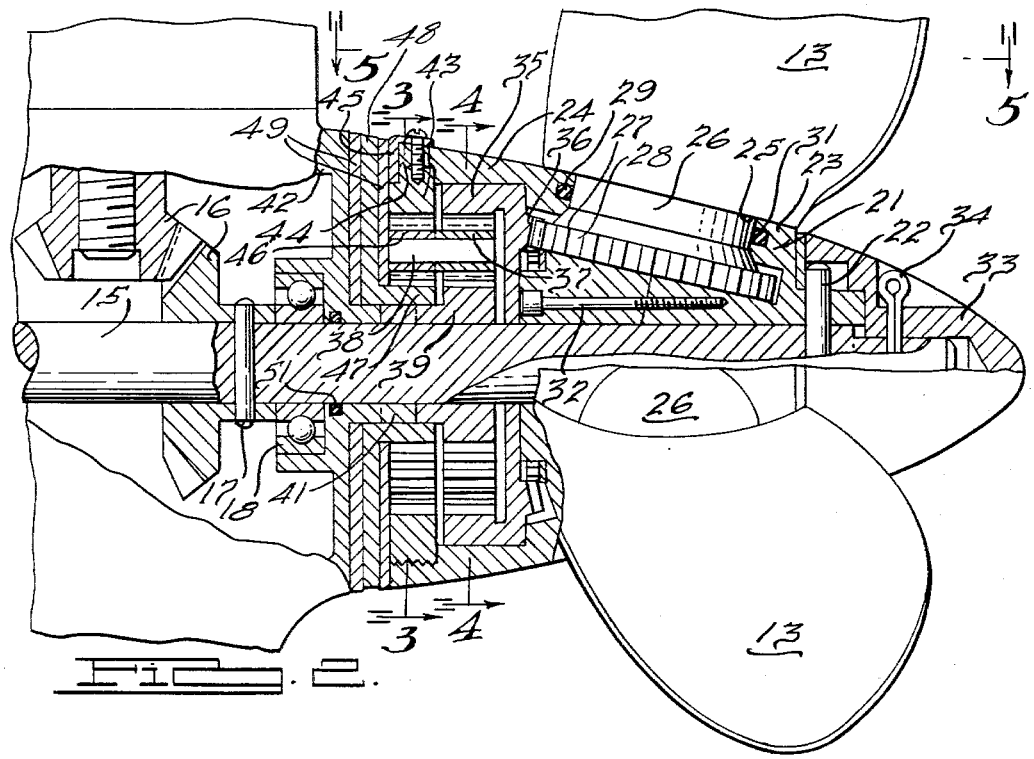
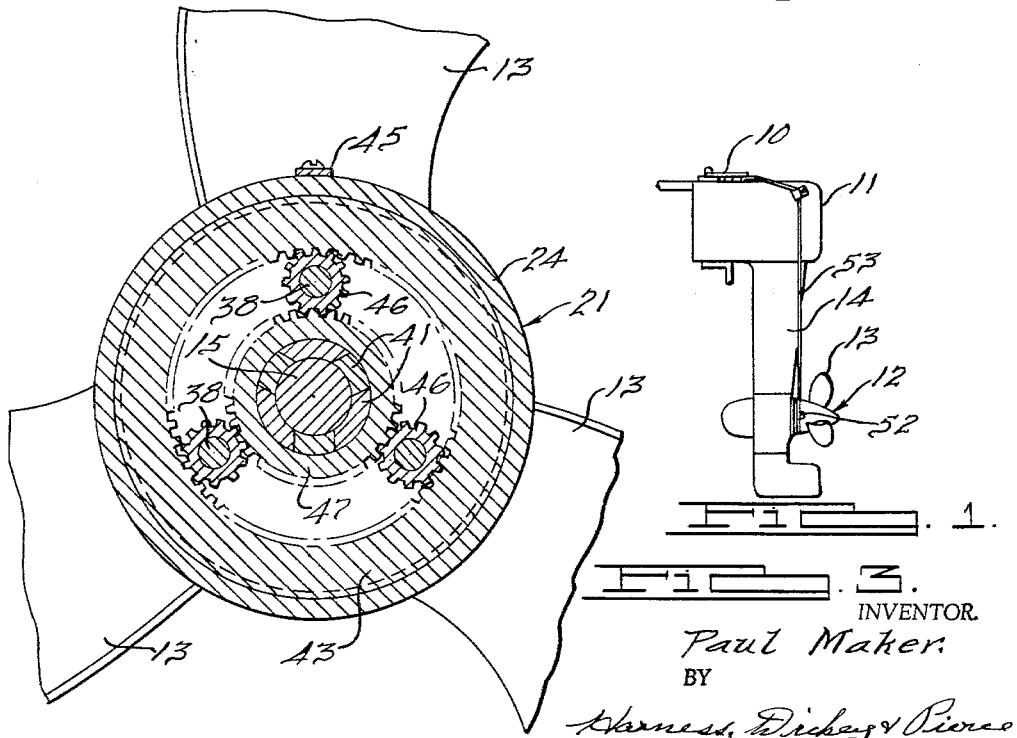
INVENTOR.
Paul Maker.
BY
Harness, Dickey & Pierce
ATTORNEYS.

May 31, 1966   P. MAKER   3,253,660
VARIABLE PITCH PROPELLER
Filed April 16, 1964   3 Sheets-Sheet 2
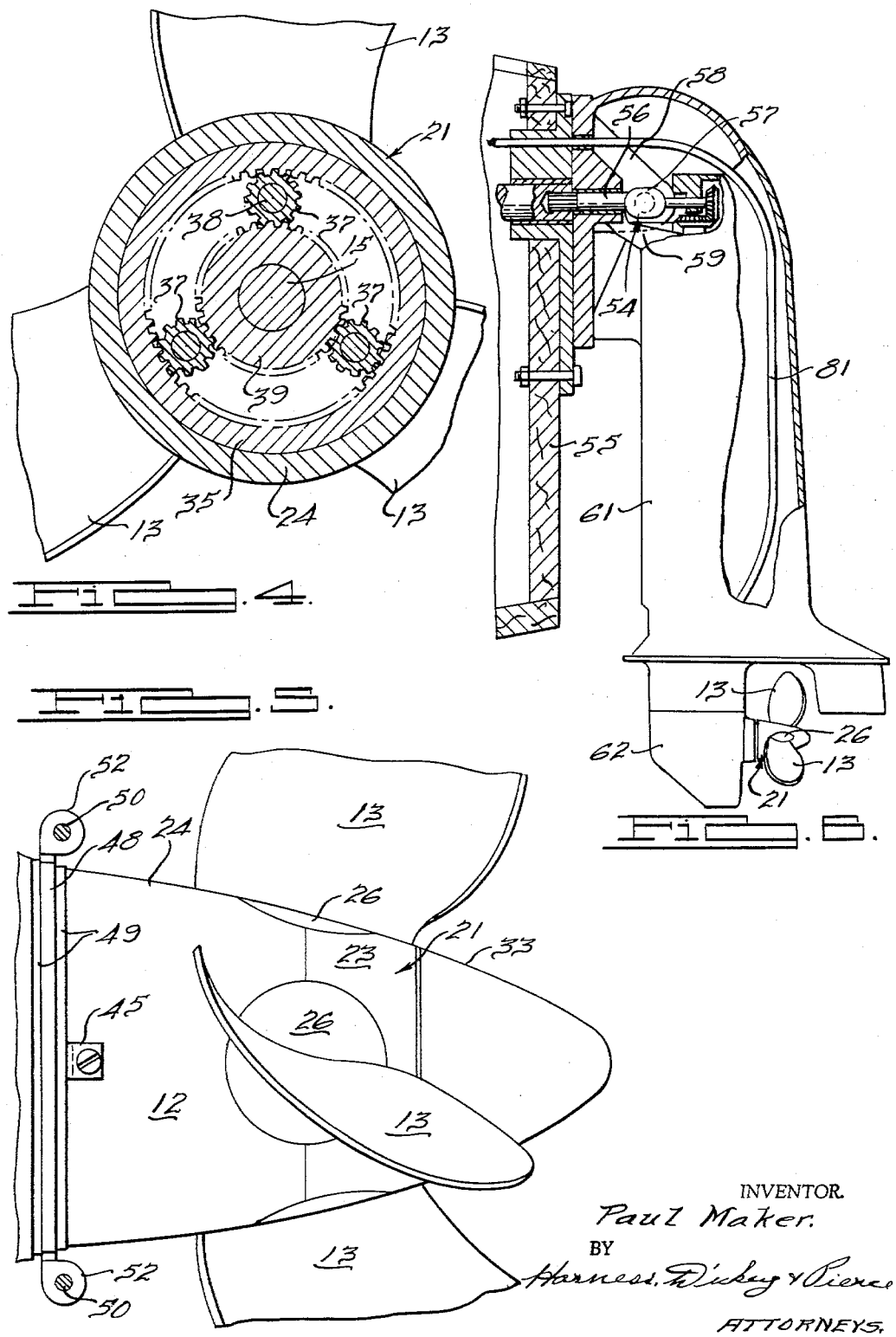
INVENTOR.
Paul Maker.
BY
Harness, Dickey & Pierce
ATTORNEYS.

May 31, 1966  P. MAKER  3,253,660
VARIABLE PITCH PROPELLER

Filed April 16, 1964  3 Sheets-Sheet 3

INVENTOR.
Paul Maker.
BY
Harness, Dickey & Pierce
ATTORNEYS.

3,253,660
VARIABLE PITCH PROPELLER
Paul Maker, Birmingham, Mich., assignor of one-fourth to Gerald L. McArthur, Walled Lake, Mich., one-fourth to Kenneth W. Verge, Farmington, Mich., and one-fourth to William Robert Kee, Birmingham, Mich.
Filed Apr. 16, 1964, Ser. No. 360,310
2 Claims. (Cl. 170—160.34)

This invention relates to propellers and particularly to a propeller having variable pitch blades.

The present invention pertains to the use of a simple, positive and low cost mechanism for adjusting the pitch of the blades of the propellers when the propellers are stationary or when being driven. Intricate and relatively costly mechanisms have been employed for changing and reversing the pitch of airplane propellers and in less costly equipment such adjusting devices would not be practical.

The mechanism of the present invention can be applied to airplane propellers, boat propellers, fans, pumps and the like, where it is desirable to change the pitch of the propeller blades for various reasons and results. The blades are mounted in the hub in a manner to be adjusted about the blade axis to change its pitch. The blade shank flange is provided with gear teeth which are engaged by the teeth of a face gear which when rotated will turn the blades about their axis at the center of the shank gear. The face gear will rotate normally with the same angular velocity as to the hub and thus retain the blades against rotation about their axes. In one form of the invention the face gear is driven by an internal ring gear having teeth in engagement with those of planet gears which engage the teeth of a fixed sun gear. The planet gears are mounted on stub shafts on which a second set of planet gears is carried having teeth engaging those of a ring gear fixed to the hub and an adjustable sun gear. In normal operation, the hub is rotated with the propeller shaft carrying the face gear and the two ring gears therewith to thereby drive both sets of planet gears about the sun gears. By moving the adjusting sun gear, the ring gear on the adjacent planetary gear set having the face gear secured thereto will be advanced an amount corresponding to the advancement of the sun gear and cause the teeth of the face gear engaging the teeth of the shank flanges to rotate the propeller blades and simultaneously change the pitch thereof during the time the shaft, hub and blades are being driven. Any means, such as a Bowden wire may be employed for moving a ring or sun gear of one set to advance a ring or sun gear of the other set. The arrangement can be applied to an airplane propeller, a propeller on a shaft extending through the bottom of a boat, an outboard propeller for an inboard engine, and the like. The two planet systems are preferably sealed within the propeller hub or in the case for the driving gears to provide longevity thereto.

Accordingly, the main objects of the invention are: to provide a simple device for adjusting the pitch of propeller blades during the driving thereof; to employ two interrelated sets of planet gears for turning the blades of a propeller about their axes by the adjustment of the sun or ring gear of one of the planet sets; to employ one or more longitudinally movable flexible wires or equivalent means for turning the ring or sun gear of a planet set to produce the angular adjustment of the blades of a propeller; to mount the interrelated planet sets within a sealed case for adjusting a sleeve extending therefrom for driving a face gear and turning the propeller blades to different angle positions, and in general, to provide an adjusting mechanism for changing the pitch of the blades of a propeller which is simple in construction, positive in operation and economical of manufacture.

Other objects and features of novelty of the invention will be specifically pointed out or will become apparent when referring for a better understanding of the invention, to the following description taken in conjunction with the accompanying drawings, wherein:

FIGURE 1 is a view in elevation of an outboard motor having a variable pitch propeller thereon which embodies features of the present invention;

FIG. 2 is a broken view, with parts in section, of the propeller and adjusting mechanism of the structure illustrated in FIG. 1;

FIG. 3 is a sectional view of the structure illustrated in FIG. 2, taken on the line 3—3 thereof;

FIG. 4 is a sectional view of the structure illustrated in FIG. 2 taken on the line 4—4 thereof;

FIG. 5 is a broken sectional view of the structure illustrated in FIG. 2, taken on the line 5—5 thereof;

FIG. 6 is a view of an outboard drive for an inboard engine with parts broken away and in section;

Figure 7:
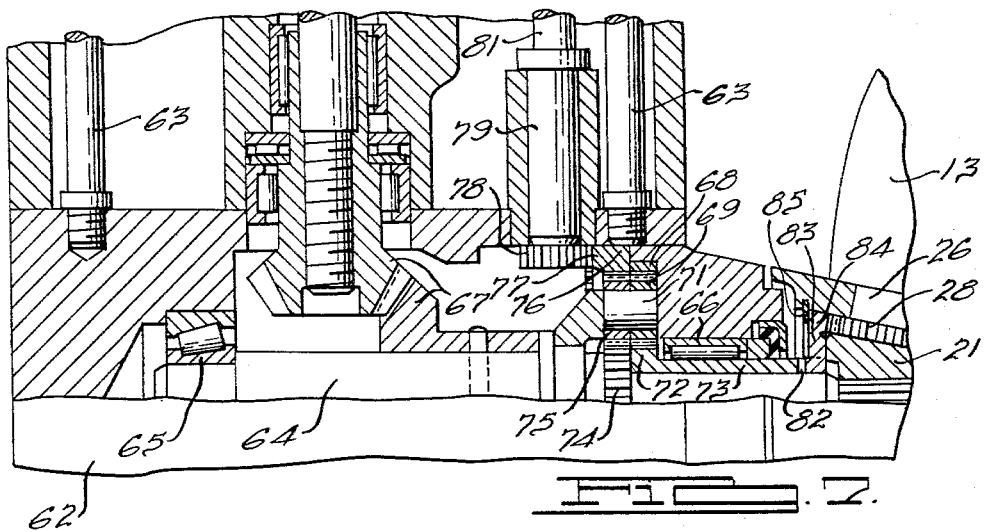
FIG. 7 is an enlarged broken view, with parts in section, of the drive and pitch control mechanism of the structure illustrated in FIG. 6.

Referring to FIGURES 1–5, an outboard motor 11 is illustrated having a propeller hub 12 with adjustable blades 13 carried on a housing 14 and controlled by a pair of push-pull cables such as the Bowden wire assemblies 53 from an operating device 10 mounted on the top of the engine. The engine and housing are of conventional form for driving a propeller shaft 15 from a pair of bevel gears 16 one of which is secured to the shaft by a pin 17. The shaft is supported by a bearing 18 and by an outboard bearing, not illustrated, on the broken end of the shaft. A hub 21 is secured to the shaft by a shear pin 22, and is made in two parts 23 and 24, each having one-half of a cylindrical aperture 25 therein. The one-half cylindrical aperture 25 in each of the parts 23 and 24 permits the cylindrical end 26 of the blades 13 along with the flange 27 having teeth 28 thereon to be received thereby. The blades are sealed by an O-ring 29 disposed about the cylindrical body 26 and retained within an annular slot 31 in the walls of the apertures 25. After the blades 13 are assembled within the apertures 25, the parts 23 and 24 of the hub are secured together by a plurality of screws 32. After the hub 21 has been assembled upon the shaft 15 by the shear pin 22, a conical nose piece 33 is secured to the shaft by a cotter pin 34. Adjustably mounted within the hub portion 24 is a ring gear 35 having a face gear 36 thereon containing teeth which mesh with the teeth 28 of the flange 27 of the blades 13. The teeth are preferably machined on a slight bevel to produce proper engagement along the flanks thereof. When the ring gear 35 is rotated within the hub, the face gear 36 rotates the body 26 of the blades 13 simultaneously to change the pitch thereof. A plurality of planet gears 37 are mounted on stub shafts 38 having teeth in mesh with the ring gear 35 and with those of a sun gear 39 which has finger 41 interlocked with the housing 42 of the motor to retain the sun gear stationary.

A ring gear 43 is secured to the hub portion 24 by a thread 44 locked in position by a flange of an angle element 45. Three planet gears 46 on the stub shafts 38 have teeth meshed with those of the ring gear 43 and also with those of a sun gear 47 which is rotatably supported within the hub in fixed relation to an adjustable disk 48. The adjustable disk is disposed between sealing washer 49 which, along with the O-rings 29 about the bodies 26 of the blades 13 and the O-ring 51 about the shaft 15 seals the area about the planet systems against the leakage of a lubricant carried therewithin.

When the shaft 15 is driven, the hub 21 is carried therewith along with the ring gears 33 and 43 driving the two sets of pinions 37 and 46 on the sun gears 39 and 47, which remain stationary. The disk 48 has bosses 52 thereon to which the wires 50 of a pair of Bowden wire assemblies 53 are secured. The wires are connected to a lever 10 which when angularly adjusted moves the wires inwardly and outwardly of the flexible sleeves of the assemblies to thereby angularly move the disk 48 and the sun gear 47 causing the pinions 46 to advance carrying the shaft 38 therewith and advancing the pinions 37 which, since the sun gear 39 is fixed, causes the ring gear 35 to advance. The advancement of the ring gear 35 advances the face gear 36 to rotate the bodies 26 of the blades 13 to change the pitch of the blades and when desired to reverse the pitch and cause the boat to be driven in the reverse direction. An interlock is preferably provided to reverse only when the engine is at low speed so that the reverse can be adjusted to low pitch. Otherwise, with a high pitch of high speed there would be a possibility of swamping the boat especially those having a low transom.

Referring to FIGS. 6 and 7, a slightly different form of the invention is illustrated that wherein the variable pitch propeller is applied to an outboard drive for an inboard motor. The drive 54 is mounted on the transom 55 of the boat with a drive shaft 56 provided with a universal joint 57. Trunnions 58 which are rotatable on a support 59 to permit the housing 61 to hinge upwardly. The support 59 may also be rotated about a vertical axis for steering purposes. At the bottom of a housing 61 a casing 62 is supported on rods 63 containing a shaft 64 supported in bearings 65 and 66. The shaft is driven by a pair of bevel gears 67 for driving the propeller hub 21 and blades 13 in the usual manner. The casing 62 has a ring gear 68 fixed thereto for driving a set of pinion gears 69 mounted on stub shafts 71 in engagement with teeth of a sun gear 72 on a sleeve 73 which is rotatable on the shaft 64. A sun gear 74 on the shaft 64 has teeth engaging the teeth of a second set of planet gears 75 mounted on the stub shaft 71 with the teeth thereof in mesh with a ring gear 76 which has a face gear 77 thereon. The teeth of the face gear are in mesh with the teeth of a gear 78 carried on a shaft 79 and rotated by a flexible driving member 81. The rotation of the gear 78 advances the ring gear 76, and the planet gears 75 on the sun gear 74 carrying the stub shaft 71 therewith thereby causing the pinion gears 69 to advance the sun gear 72 and the sleeve 73. The sleeve has fingers 82 extending in slots in a disk portion 83 of a face gear 84 retained in position by a snap ring 85. The teeth of the face gear 84 are in engagement with the teeth 28 on the flange of the body 26 of the blades 13. The sleeve 73 rotates the bodies and the blades and simultaneously adjusts the blades to a different pitch. The propeller may be continuously adjusted from a low to a high pitch, and to a reverse pitch for reversing the drive of a boat or moving a fluid in the reverse direction.

Figure 8:
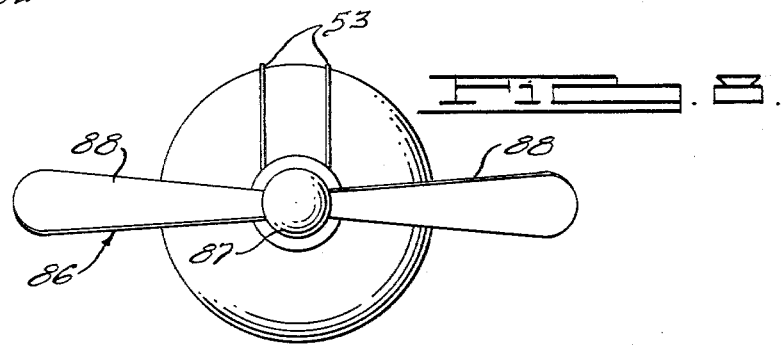
FIG. 8 is a view in elevation of a propeller for an airplane having the pitch changing mechanism for the blades embodying features of the present invention.
Figure 9:
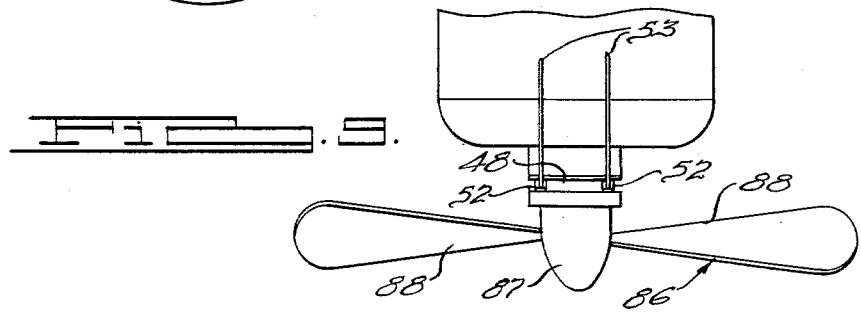
FIG. 9 is a broken, plan view of the structure illustrated in FIG. 8.

In FIGS. 8 and 9, an airplane propeller 86 is illustrated having a hub 87 carrying two blades 88. The blades are rotatable on their axis by the use of the double planetary gear system, in combination with a face gear having its teeth in engagement with the teeth on the flange of the propeller as hereinabove described. Bosses 52 are provided on the disk 48 which carries the ring or the sun gear in one planet set for causing the movement of the ring or sun gear of the other planet set. This produces the rotation of the blades 88 about their axes to change or reverse the pitch of the blades relative to the hub 87. One or a pair of Bowden wires 53 are employed for rotating the disk 48 from the cockpit for adjusting the pitch of the propeller blades.

Figure 10:
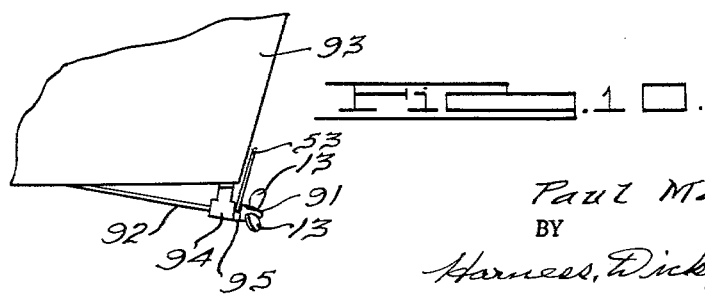
FIG. 10 is a broken view in elevation of the drive shaft for a boat having a propeller and pitch control mechanism of the present invention secured thereto.

In FIG. 10, a variable pitch propeller 91 is illustrated attached to a shaft 92 extending through the bottom of a boat 93. The shaft is supported on a bracket 94 which supports the stationary part of the adjusting mechanism 95 for turning the blades 13 on their axes as pointed out hereinabove. The disk for shifting the ring or sun gear of one planet system is rotated by one or a pair of Bowden wires 53 in the manner as pointed out hereinabove, through longitudinal adjustment of the wire of the Bowden assembly. The disk is adjusted to change the pitch of the propeller for driving the boat at different speeds conforming to the load and for reversing the blades to reverse the drive of the boat.

In any of the various constructions herein illustrated, a simple positive mechanism is provided for changing the pitch of the blades of the propeller during the time that the propeller is being driven or when in stationary position. While a Bowden wire was shown along with a flexible rotatable element for adjusting the device it is to be understood that any remote controlled servo mechanism known to be suitable can also be employed to rotate one of the gears of a planet set to change the pitch of the propeller.

In the drawings and specifications the planet sets, the blade gear, and the face gear are all illustrated and described as having teeth but it is to be understood that other drives such as a friction drive may be employed in lieu thereto. In such case a servo or other self-compensating mechanism would be required to compensate for the slippage of the friction members. A pin and slot connection could be substituted for the teeth of the face and blade gears so that when reference is made in the claims of gear and gear teeth it is to be understood that other drives, known to be suitable, is to be covered thereby. It is also to be understood that the adjustable handle of the operating device 10 gives an indication of the angular position of the blades since a direct connection is provided by the Bowden assemblies 53.

In a large assembly of the blades in a propeller for freight and passenger lines, naval vessels and the like, fluid means are employed for rotating the blades from which no direct indication is obtainable to locate the angular position of the blades. In such event a servo mechanism is employed which is actuated by an element for rotating the blades to provide a direct connection to indicate the angular position of the blades and therefore the pitch of the propeller both forward and in reverse. It is to be further understood that in any such large constructions it is advisable to interconnect the stub shafts 47 with carriers or spiders at one or both ends to maintain the shafts in accurate space, parallel relationship to each other at all times.

What is claimed is:

1. In a propeller, a hub, a plurality of blades mounted for rotation about their axes on said hub, gear means on each said blade, a ring gear having face teeth engaging the teeth of said blades, a set of planet gears on stub shafts in engagement with the inner teeth of said ring gear, a fixed sun gear having teeth engaged by the teeth of said planet gears forming a first planet gear set, a second planet gear set comprising a ring gear secured to said propeller hub having teeth in mesh with the teeth of a planet gear set carried by the stub shafts of the planet gears of said first set, a movable sun gear engaging the teeth of the second planet gear set, and means associated with the sun gear of the second planet gear set for moving the planet gear set and the stub shafts to thereby move the ring of the first planet gear set to rotate the blades about their axes.

2. In a propeller, a hub, a plurality of blades mounted for rotation about their axes on said hub, gear means on each said blade, a ring gear having face teeth engaging the teeth of said blades, a set of planet gears on stub shafts in engagement with the inner teeth of said ring gear, a fixed sun gear having teeth engaged by the teeth of said planet gears forming a first planet gear set, a second planet gear set comprising a ring gear secured to said propeller hub having teeth in mesh with the teeth of a planet gear set carried by the stub shafts of the planet gears of said first set, a movable sun gear engaging the teeth of the second planet gear set, means associated with the sun gear of the second planet gear set for moving the planet gear set and the stub shafts to thereby move the ring gear of the first planet gear set to rotate the blades about their axes, said associated means being a disk, and means engaging said disk for producing its angular adjustment.

References Cited by the Examiner

UNITED STATES PATENTS

| | | | |
|---|---|---|---|
| 1,596,511 | 8/1926 | Pistolesi | 170—160.35 |
| 1,782,167 | 11/1930 | Greene | 170—160.48 |
| 1,969,280 | 8/1934 | Smith | 170—160.35 |
| 1,999,091 | 4/1935 | Ebert | 170—160.35 |
| 2,620,887 | 12/1952 | Tiedeman et al. | 170—160.35 |
| 3,092,186 | 6/1963 | MacLean | 170—160.48 X |

FOREIGN PATENTS

| | | |
|---|---|---|
| 107,560 | 5/1939 | Australia. |
| Add44,980 | 2/1935 | France. |
| 931,944 | 11/1947 | France. |
| 675,767 | 7/1952 | Great Britain. |

MARK NEWMAN, *Primary Examiner.*

JULIUS E. WEST, *Examiner.*

W. E. BURNS, *Assistant Examiner.*